(12) United States Patent
Wei et al.

(10) Patent No.: US 10,736,479 B2
(45) Date of Patent: Aug. 11, 2020

(54) DRIVE-WHEEL SUSPENSION MECHANISM FOR SMART MOVABLE DEVICE AND SMART MOVABLE DEVICE

(71) Applicant: Jiangsu Midea Cleaning Appliances Co., Ltd., Suzhou (CN)

(72) Inventors: Xianmin Wei, Suzhou (CN); Xiaogang Xuan, Suzhou (CN)

(*) Notice: Subject to any disclaimer, the term of this patent is extended or adjusted under 35 U.S.C. 154(b) by 112 days.

(21) Appl. No.: 16/121,661

(22) Filed: Sep. 5, 2018

(65) Prior Publication Data

US 2019/0193499 A1 Jun. 27, 2019

Related U.S. Application Data

(63) Continuation of application No. PCT/CN2018/098022, filed on Aug. 1, 2018.

(51) Int. Cl.
*A47L 9/00* (2006.01)
*A47L 11/40* (2006.01)
*A47L 9/28* (2006.01)
*B60G 11/14* (2006.01)

(52) U.S. Cl.
CPC ............ *A47L 9/2852* (2013.01); *A47L 9/009* (2013.01); *A47L 11/4072* (2013.01); *A47L 2201/00* (2013.01); *B60G 11/14* (2013.01); *B60G 2300/00* (2013.01)

(58) Field of Classification Search
CPC .......... A47L 9/2852; A47L 9/009; A47L 9/00; A47L 11/4072; A47L 11/40; A47L 2201/00; B60G 2300/00; B60G 11/14
USPC .......................................... 280/124.1; 901/1
See application file for complete search history.

(56) References Cited

U.S. PATENT DOCUMENTS

| 5,586,777 A | * | 12/1996 | Wolf | ................ A63C 17/0073 280/11.232 |
| 5,785,327 A | * | 7/1998 | Gallant | ................ A63C 17/20 280/11.233 |
| 6,353,957 B1 | * | 3/2002 | Wolfe | .................... F16H 3/003 15/49.1 |

FOREIGN PATENT DOCUMENTS

| CN | 201777130 U | 3/2011 |
| CN | 202920081 U | 5/2013 |
| CN | 204218833 U | 3/2015 |
| CN | 204955961 U | 1/2016 |
| CN | 204955962 U | 1/2016 |
| CN | 105640445 A | 6/2016 |
| CN | 107440614 A | 12/2017 |
| JP | 2015093129 A | 5/2015 |

OTHER PUBLICATIONS

International Search report dated Nov. 1, 2018 in the corresponding PCT application(application No. PCT/CN2018/098022).

* cited by examiner

*Primary Examiner* — Keith J Frisby
(74) *Attorney, Agent, or Firm* — Kilpatrick Townsend & Stockton, LLP (57) ABSTRACT

A drive-wheel suspension mechanism for a smart movable device and a smart movable device, include a drive wheel bracket, a gearbox and a resilient reset member. The drive wheel bracket is provided with at least one set of sliding slot assembly arranged oppositely. The sliding slot assembly includes two first sliding slots arranged opposite to each other, and the first sliding slot extends rearward and an included angle between the first sliding slot and a horizontal plane is greater than or equal to 0 degree.

17 Claims, 7 Drawing Sheets

Prior Art

Fig. 1

Prior Art

DRIVE-WHEEL SUSPENSION MECHANISM FOR SMART MOVABLE DEVICE AND SMART MOVABLE DEVICE

CROSS-REFERENCE TO RELATED APPLICATION

This application is a continuation of International Application No. PCT/CN2018/098022, filed on Aug. 1, 2018, which claims priority to Chinese Patent Application Serial No. 201721862856.5, filed with the State Intellectual Property Office of P. R. China on Dec. 27, 2017, the entire content of which is incorporated herein by reference.

FIELD

The present disclosure relates to a field of smart movable devices, and particularly to a drive-wheel suspension mechanism for a smart movable device and a smart movable device.

BACKGROUND

For more intelligent cleaning, a robot vacuum cleaner appears in the market. The robot vacuum cleaner can separately complete the cleaning without an operator. In order to enable the robot vacuum cleaner to be steady and capable of crossing a small obstacle during operation, the robot vacuum cleaner in the related art adds a lifting wheel design for a drive wheel apparatus. The robot vacuum cleaner crosses the obstacle by a lifting change of the drive wheel when encountering the obstacle.

Figure 1:
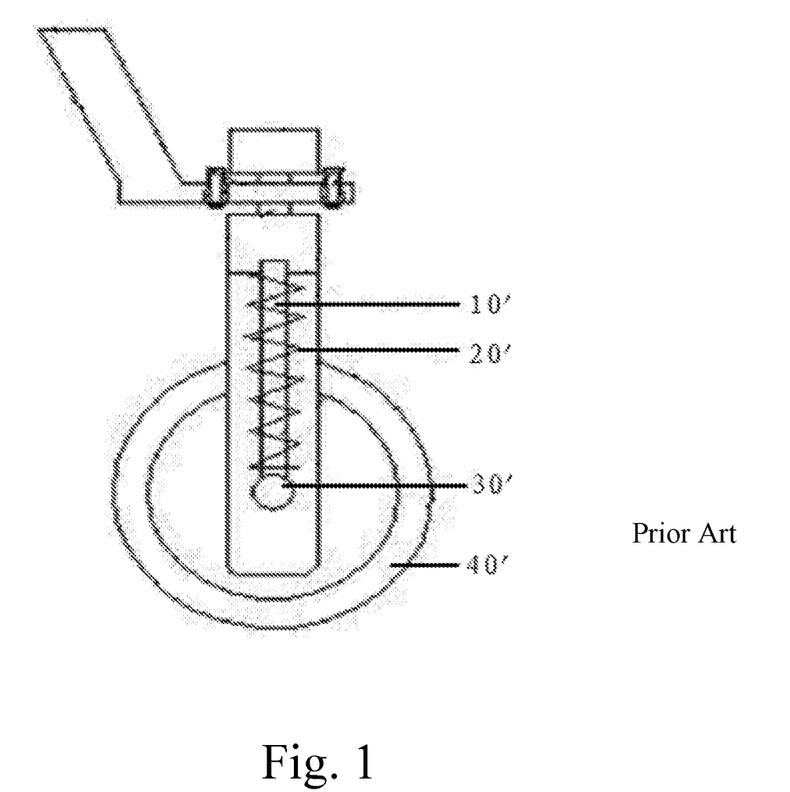
FIG. 1 is a schematic view of a drive wheel suspension in the related art.

There are two main designs for the existing drive wheel suspension:

1) FIG. 1 is a schematic view of a drive wheel suspension in the related art. As illustrated in FIG. 1, a tire shaft bracket 10' is provided with a spring 20' thereon, a lower end of the tire shaft bracket 10' is connected to a tire shaft 30', a drive wheel 40' is mounted on the tire shaft 30', if the drive wheel 40' encounters an obstacle during movement, the tire shaft 30' and the tire shaft bracket 40' move upward due to resistance of the obstacle, the spring is stressed and deformed, and the tire shaft 30' drives the drive wheel 40' to move upward so as to cross the obstacle.

Figure 2:
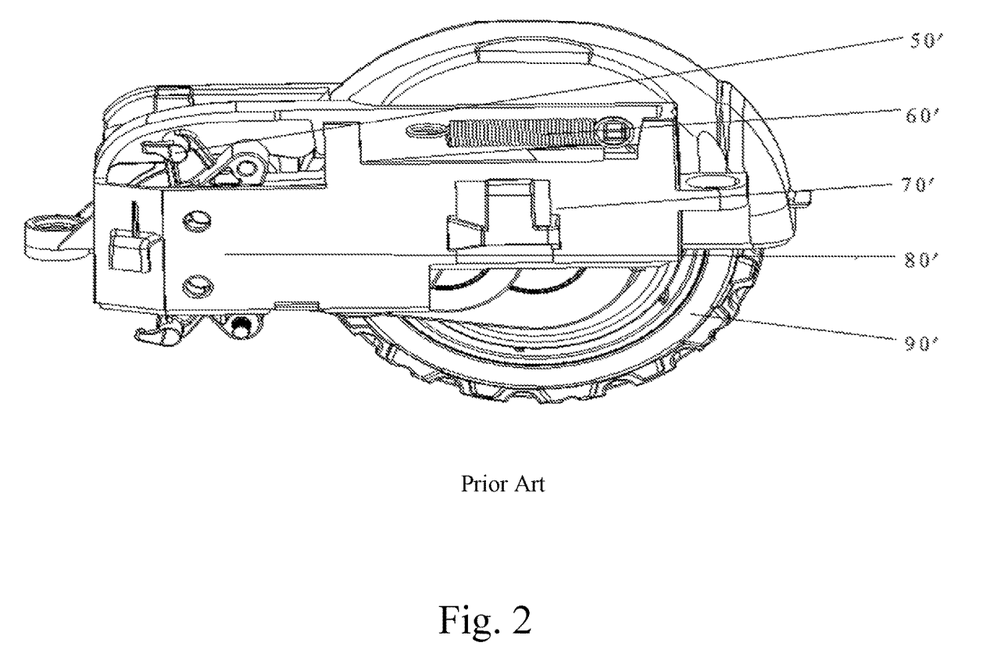
FIG. 2 is a schematic view of another drive wheel suspension in the related art.

2) FIG. 2 is a schematic view of another drive wheel suspension in the related art. As illustrated in FIG. 2, a tension spring 60' is mounted between a drive-wheel front fixed end 50' and a drive-wheel fixing frame 70', and a drive wheel 90' is mounted on the drive-wheel fixing frame 70'. When the drive wheel 90' is subjected to resistance by encountering the obstacle during movement, the drive wheel 90' swings upwards from an initial position about an inner rotation fulcrum 80', the corresponding drive-wheel front fixed end 50' swings downwards, and in this case, the tension spring 60' deforms. When the resistance applied to the drive wheel 90' becomes smaller, the tension spring 60' pulls the drive-wheel front fixed end 50' up, and the drive wheel 90' moves downwards to the initial position.

When the existing robot vacuum cleaner encounters the obstacle during movement, the whole machine is subjected to the impact, the robot vacuum cleaner will decelerate rapidly, and the vibration generated by the impact will bring harm to performance of the whole machine.

SUMMARY

For this purpose, a main objective of the present disclosure is to provide a drive-wheel suspension mechanism for a smart movable device and a smart movable device, which can effectively have a buffering and damping function and improve an ability to cross an obstacle for the smart movable device during a movement of the smart movable device.

To this end, a technical solution of the present disclosure is implemented such that:

An aspect of the present disclosure provides a drive-wheel suspension mechanism for a smart movable device. The drive-wheel suspension mechanism includes a drive wheel bracket, a gearbox and a resilient reset member. The gearbox is located in the drive wheel bracket, and the drive wheel bracket is provided with at least one set of sliding slot assembly arranged oppositely, the gearbox is provided with at least one sliding shaft mutually fitted with and sliding in the at least one set of sliding slot assembly; the resilient reset member has a first end fixed to the gearbox, and a second end fixed to the drive wheel bracket or a main frame of the smart movable device; and the sliding slot assembly includes two first sliding slots arranged opposite to each other, the first sliding slot extends rearwards and an included angle between the first sliding slot and a horizontal plane is greater than or equal to 0 degree; the sliding shaft is located at a front end of the first sliding slot when the resilient reset member is in an initial state; and the sliding shaft at least includes one axle.

In some embodiments, the drive wheel bracket is provided with two sets of sliding slot assembly arranged oppositely, the gearbox is provided two sliding shafts mutually fitted with and sliding in the two sets of sliding slot assembly respectively, and one of the two sliding shafts is the axle.

In some embodiments, the drive-wheel suspension mechanism further includes a drive wheel mounted to the axle.

In some embodiments, the gearbox is further provided with a drive motor configured to control a movement of the axle, the gearbox is arranged obliquely upwards and rearwards, the axle is disposed at a lower end of the gearbox, and the drive motor is disposed at an upper end of the gearbox.

In some embodiments, the drive wheel bracket includes a side plate disposed at a front end of the drive wheel bracket, the second end of the resilient reset member is fixed to the side plate, and the resilient reset member is a tension spring.

In some embodiments, the sliding slot assembly further includes a second sliding slot arranged angularly and downwardly with respect to the front end of the first sliding slot, an included angle between the second sliding slot and the first sliding slot is greater than or equal to 90 degrees, and the sliding shaft is slidable in the first sliding slot and the second sliding slot.

In some embodiments, the first sliding slot is parallel to the horizontal plane, and the included angle between the second sliding slot and the first sliding slot is greater than or equal to 90 degrees.

In some embodiments, the first sliding slot extends rearwards and the included angle between the first sliding slot and the horizontal plane is greater than 0 degree, and the second sliding slot extends forwards and an included angle between the second sliding slot and a vertical plane is greater than 0 degree.

In some embodiments, the sliding slot assembly which is mutually fitted with the axle and in which the axle slides further includes a second sliding slot arranged angularly and downwardly with respect to the front end of the first sliding slot, an included angle between the second sliding slot and the first sliding slot is greater than or equal to 90 degrees, and the axle is slidable in the first sliding slot and the second sliding slot.

Another aspect of the present disclosure further provides a smart movable device, the smart movable device includes a main frame and a drive-wheel suspension mechanism connected to the main frame, the drive-wheel suspension mechanism is a drive-wheel suspension mechanism according to any one of preceding items.

In some embodiments, the smart movable device further includes a front wheel disposed to the main frame.

In some embodiments, the smart movable device is a robot vacuum cleaner.

The present disclosure provides the drive-wheel suspension mechanism for the smart movable device. The basic principle of the drive-wheel suspension mechanism is that when the smart movable device encounters the obstacle during traveling, the axle slides in the sliding slot and drives the resilient reset member to deform, impact energy generated by the impact which is applied to the smart movable device is converted into elastic potential energy to be stored in the resilient reset member, so as to have effective buffering and damping effect; after the impact energy is completely converted into the elastic potential energy, the resilient reset member starts to restore and drive the drive wheel to move forward, such that the smart movable device body can cross the obstacle better. The present disclosure also provides a smart movable device, the smart movable device is provided with the drive-wheel suspension mechanism, thereby improving the ability of the smart movable device to cushion and to cross the obstacle.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

In the present disclosure, the orientation words "front" and "rear" refer to the case where the movement direction of a smart movable device when moving forward on a horizontal ground is served as the front, and the orientation words "up" and "down" refer to the relative position relationship of a vertical direction.

Embodiments provide a drive-wheel suspension mechanism for a smart movable device, the drive-wheel suspension mechanism includes a drive wheel bracket, a gearbox and a resilient reset member. The gearbox is located in the drive wheel bracket, and the drive wheel bracket is provided with at least one set of sliding slot assembly, the gearbox is provided with at least one sliding shaft mutually fitted with and sliding in the at least one set of sliding slot assembly. The resilient reset member has a first end fixed to the gearbox and a second end fixed to the drive wheel bracket or a main frame of the smart movable device. The sliding slot assembly includes two first sliding slots arranged opposite to each other, the first sliding slot extends rearwards and an included angle between the first sliding slot and a horizontal plane is greater than or equal to 0 degree. The sliding shaft is located at a front end of the first sliding slot when the resilient reset member is in an initial state. The sliding shaft at least includes one axle.

Figure 3:
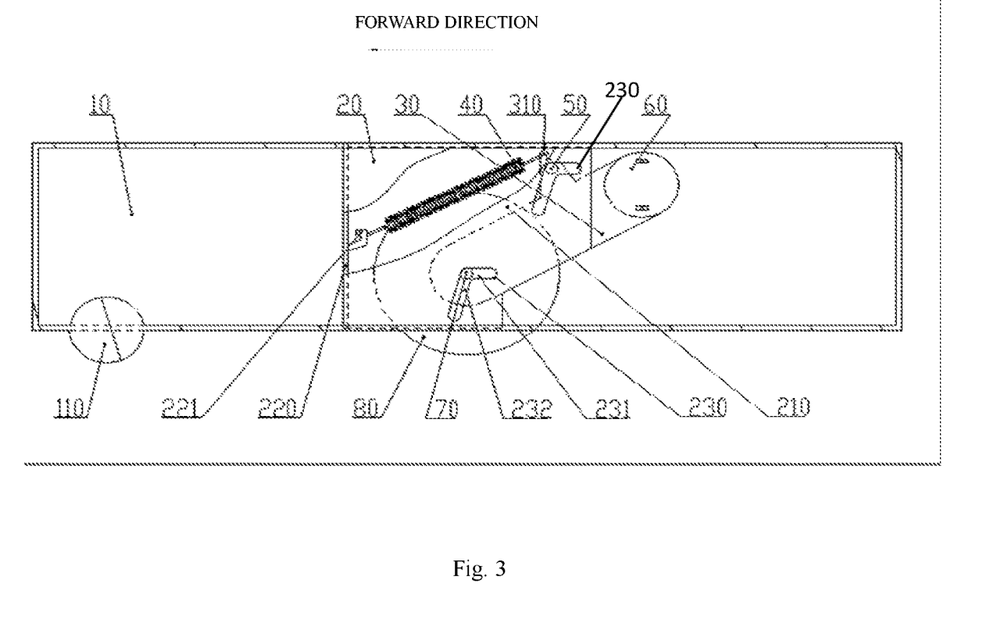
FIG. 3 is a schematic view of a smart movable device provided by an embodiment of the present disclosure.

FIG. 3 illustrates a schematic view of an example smart movable device in accordance with the disclosure. As shown, the smart movable device, in this example, includes a main frame 10 and a drive-wheel suspension mechanism connected to the main frame 10. The drive-wheel suspension mechanism can include a drive wheel bracket 20, a gearbox 30 and a resilient reset member, such as a tension spring 40 shown in this example. The drive wheel bracket 20 includes two oppositely disposed vertical plates 210 and a side plate 220 connected to front ends of the two vertical plates 210. The side plate 220 is provided with one fixing point 221. The two vertical plates 201 are provided with two sets of sliding slot assembly 230 arranged oppositely. Each set of sliding slot assembly 230 includes two upper sliding slots 231 arranged opposite to each other and two down sliding slots 232 arranged opposite to each other. The upper sliding slot 231 extends rearwards and is parallel to a horizontal plane, and the down sliding slot 232 is obliquely downward. In this example, as shown, an angle between the down sliding slot 232 and the upper sliding slot 231 is greater than 90 degrees. The gearbox 30 is located between the two vertical plates 210 and is obliquely disposed upwards and rearwards. The gearbox 30 is provided with a fixing point 310, a drive motor 60 and a sliding shafts 50 fitted in one of sliding slot assemblies 230, and the sliding shaft 50 is slidable in the upper sliding slot 231 and the down sliding slot 232. The drive motor 60 is disposed at an upper end of the gearbox 30, one of the two sliding shafts 50 is an axle 70, and the axle 70 is disposed at a lower end of the gearbox 30. A drive wheel 80 is mounted to the axle 70. The tension spring 40 has a first end fixed to the fixing point 310 of the gearbox 30 and a second end fixed to the fixing point 221 of the side plate 220. The main frame 10 of the smart movable device is provided with a front wheel 110 thereon.

The above-described sliding shaft 50 may be include long shaft, and two ends of the long shaft can slide in the set of sliding slot assembly 230 oppositely disposed on the two vertical plates 210. The sliding shaft 50 may also be constituted by two short shafts arranged coaxially. Each of the two short shafts has a first end fixed to the gearbox 30 and a second end slidable in the set of sliding slot assembly 230 oppositely disposed on the two vertical plates 210.

Figure 4:
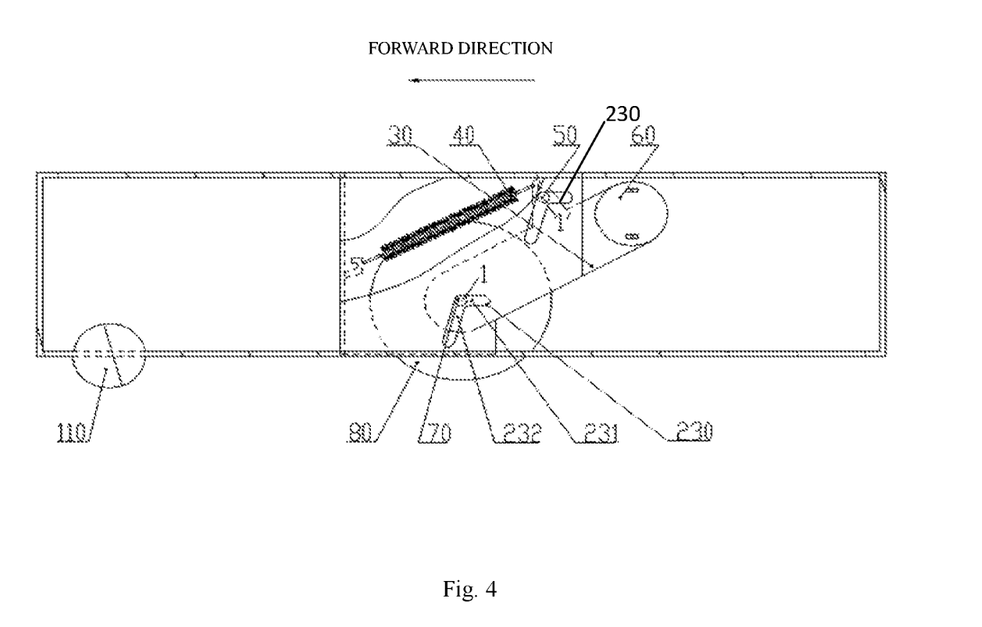
FIG. 4 is a schematic view of a state in which a sliding shaft is in a sliding slot assembly during a normal movement of the smart movable device provided in FIG. 3.

As illustrated in FIG. 4, when the smart movable device is in a normal movement, the drive motor 60 on the gearbox 30 drives the drive wheel 80 to continuously rotate forwards and drives the front wheel 110 to move forwards, and the smart movable device travels along a direction indicated by an arrow in this figure.

When the smart movable device is in use, the drive wheel 80 contacts the ground, due to the pressure of the deadweight of the smart movable device body, the drive wheel 80 slides upwards with the axle 70 along the down sliding slot 232 of the sliding slot assembly 230 at the lower end of the gearbox 30 to a position 1—as shown, position 1 is where the upper sliding slot 231 and the down sliding slot 232 are intersected. At the same time, the sliding shaft 50 located in the sliding slot assembly 230 at the upper end of the gearbox 30 slides upwards along the down sliding slot 232 of this sliding slot assembly 230 to a position 1' where the upper sliding slot 231 and the down sliding slot 232 are intersected. During the traveling of the smart movable device on the flat ground, the axle 70 in the sliding slot assembly 230 at the lower end of the gearbox 30 is always located in the position 1, and the sliding shaft 50 in the sliding slot assembly 230 at the upper end of the gearbox 30 is always located in the position 1', and the tension spring 40 of the drive-wheel suspension mechanism is kept in a free state without deformation.

Figure 5:
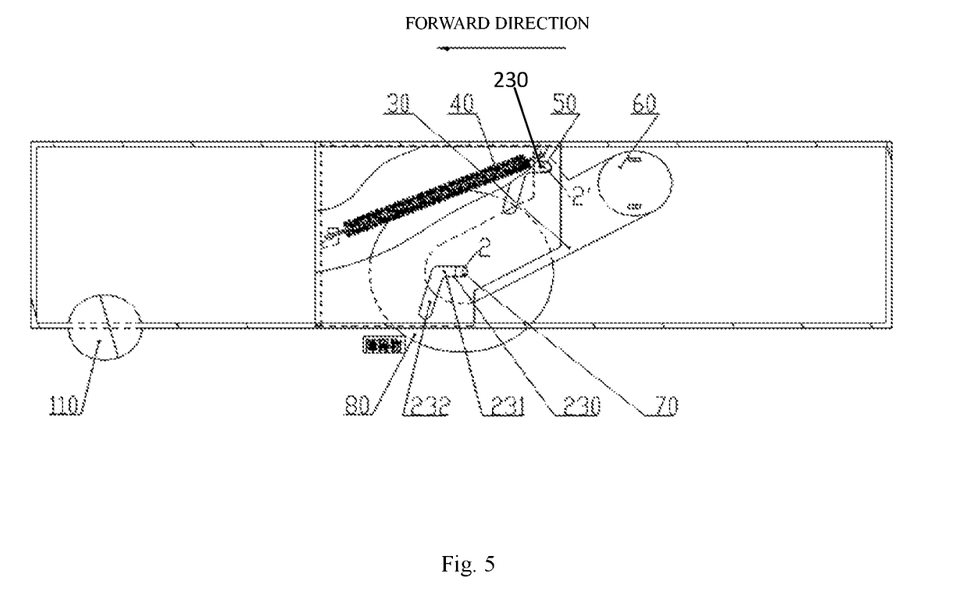
FIG. 5 is a schematic view of a state in which a sliding shaft is in a sliding slot assembly while the smart movable device provided in FIG. 3 encounters an obstacle during movement.

As illustrated in FIG. 5, when the smart movable device of the present embodiment encounters the obstacle during traveling, the smart movable device is subjected to an impact and starts to slow down, and the smart movable device proceeds to slide forwards due to the influence of the inertia. The drive wheel 80 slides rearwards along with the axle 70 in the sliding slot assembly 230 at the lower end of the gearbox 30 along the upper sliding slot 231 from the position 1 in the sliding slot assembly 230 to a position 2 at a rightmost end of the upper sliding slot 231, and meanwhile, the sliding shaft 50 located in the sliding slot assembly 230 at the upper end of the gearbox 30 slides rearwards along the upper sliding slot 231 from the position 1' in the sliding slot assembly 230 to a position 2' at the rightmost end of the upper sliding slot 231. During this sliding process, the gearbox 30 of the drive-wheel suspension mechanism drives the tension spring 40 to continuously stretch. When impact energy is completely converted into elastic potential energy, the tension spring 40 starts to pull back, the elastic potential energy is converted into a pulling force, which pulls the gearbox 30 to move forward and drive the drive wheel 80 to cross the obstacle.

Figure 6:
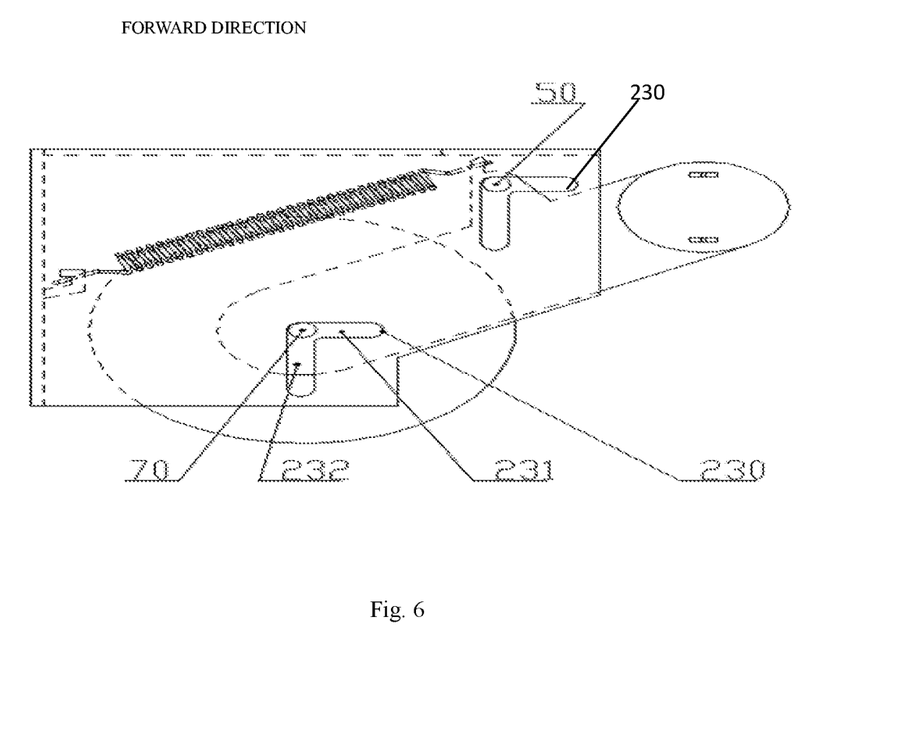
FIG. 6 is a schematic view of a drive-wheel suspension mechanism with another sliding slot assembly of the present disclosure.

As illustrated in FIG. 6, another structural form of the sliding slot assembly 230 may be that the upper sliding slot 231 extends rearwards and is parallel to the horizontal plane, the down sliding slot 232 is perpendicular to the upper sliding slot 231 and extends downwards, and the sliding shaft 50 and the axle 70 can slide in the first sliding slot 211 and the second sliding slot 212.

Figure 7:
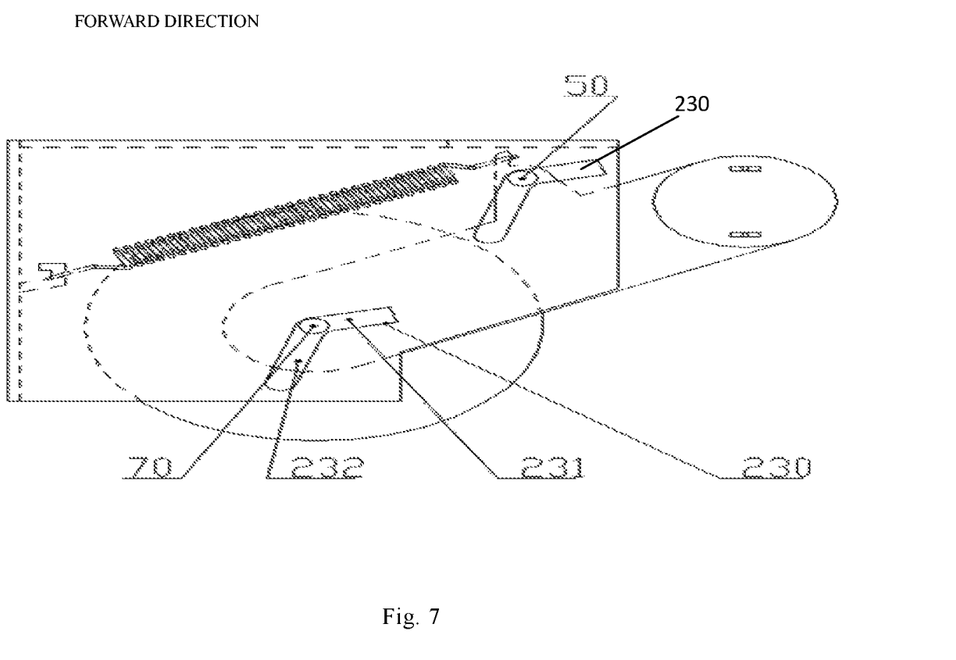
FIG. 7 is a schematic view of a drive wheel suspension with a third sliding slot assembly of the present disclosure.

As illustrated in FIG. 7, a third structural form of the sliding slot assembly 230 may also be that the upper sliding slot 231 extends rearwards and an included angle between the first sliding slot and the horizontal plane is greater than 0 degree and less than 90 degrees, the down sliding slot 232 extends obliquely downwards and an included angle between the down sliding slot 232 and the vertical plane is greater than 0 degrees, and the sliding shaft 50 and the axle 70 can slide in the upper sliding slot 231 and the down sliding slot 232.

In other embodiments, the sliding slot assembly 230 is not limited to the three structural forms shown in FIGS. 3 and 6-7, it is also possible that only the upper sliding slot 231 is provided, the first sliding slot extends rearwards and the included angle between the upper sliding slot 231 and the horizontal plane is greater than or equal to 0 degree, and the down sliding slot 232 is omitted. The structural form of the sliding slot assembly 230 may also be that the siding groove assembly 230 which is mutually fitted with the axle 70 and in which the axle 70 slides includes any one kind of the upper sliding slots 231 and the down sliding slots 232 described above, and the other sliding slot assembly 230 only has the upper sliding slot 231 and omits the down sliding slot 232.

In other embodiments, the resilient reset member may also be configured as a structural form that deforms when compressed. For example, the tension spring 40 is changed to a compression spring. The compression spring is configured to have a first end disposed to the fixing point 310 of the gearbox, and a second end disposed to a certain portion of the drive wheel bracket or the main frame behind the fixing point 310. Similarly, the second end of the tension spring 40 may be disposed to a certain portion of the drive wheel bracket or main frame in front of the fixing point 310. The specific positions of the two ends of the resilient reset member can be set according to the required elastic force of the resilient reset member and Hooke's law, as long as the sliding shaft 50 is in the front end position of the upper sliding slot 231 when the resilient reset member is in an initial state.

In other embodiments, the vertical plate 210 may also have various structural forms, such as two end plates formed by bending a plate. The arrangement of the gearbox 30 and the position of the motor 60 both can be adjusted according to practical requirements, which will not be discussed herein.

It should note that, the above multiple embodiments only have described the solutions that the drive-wheel suspension mechanism includes two sets of sliding slot assembly and two corresponding sliding shafts. According to practical requirements, the drive-wheel suspension mechanism may also be provided with more than two sets of sliding slot assembly and more than two corresponding sliding shafts; or the number of sets of the sliding slot assembly is greater than the number of the sliding shaft, such that the sliding shaft is mounted in the sliding slot assembly of different heights to slide therein, so as to adjust the height of the drive wheel from the ground, according to different ground conditions, such as tile, carpet, etc. The smart movable device of the present disclosure is not limited to the robot vacuum cleaner, and also includes a dust collector or the like.

The above-described are merely specific embodiments of the present disclosure, but the protection scope of the present disclosure is not limited thereto. The conceivable change or replacement by those skilled in art within the technical scope disclosed by the present disclosure should be covered in the protection scope of the present disclosure. Therefore, the protection scope of the present disclosure should be defined by the protection scope of the claims.

What is claimed is:

1. A drive-wheel suspension mechanism for a smart movable device, the drive-wheel suspension system comprising a drive wheel, a drive wheel bracket, a gearbox and a resilient reset member, wherein the drive wheel is arranged partially within the drive wheel bracket;

the drive wheel bracket is provided with a first sliding slot assembly arranged at a lower end of the gear box and a second sliding slot assembly arranged at an upper end of the gear box, wherein the first sliding slot assembly comprises a first down sliding slot and a first upper sliding slot, and the second sliding slot assembly comprises a second down sliding slot and a second upper sliding slot, wherein the drive wheel is mounted to an axle disposed at the lower end of the gear box, and the axle is configured to slide in the first sliding slot assembly;

the gearbox is located in the drive wheel bracket, and is provided with at least one sliding shaft configured to slide within the second sliding slot assembly; and the resilient reset member has a first end fixed to the gearbox and a second end fixed to the drive wheel bracket; and, wherein when the drive wheel is rotating on a flat surface, the axle is located at a juncture of the down and upper sliding slots of the first sliding slot assembly, the shaft is located at a juncture of the down and upper sliding slots of the second sliding slot assembly, and the resilient reset member is in a non-elastic position; and when the drive wheel encounters an obstacle, the axle slides across the upper sliding slot of the first sliding slot assembly, the shaft slides across the upper sliding slot of the second sliding slot assembly, and the resilient reset member stretches into an elastic position.

2. The drive-wheel suspension mechanism according to claim 1, wherein the gearbox is further provided with a drive motor configured to control a movement of the axle, the gearbox is arranged obliquely upwards and rearwards, the axle is disposed at a lower end of the gearbox, and the drive motor is disposed at an upper end of the gearbox.

3. The drive-wheel suspension mechanism according to claim 2, wherein the drive wheel bracket comprises a side plate disposed at a front end of the drive wheel bracket, the second end of the resilient reset member is fixed to the side plate, and the resilient reset member is a tension spring.

4. The drive-wheel suspension mechanism according to claim 1, wherein the down sliding slot of the first sliding slot assembly is arranged angularly and downwardly with respect to the front end of the upper sliding slot of the first sliding slot assembly, wherein an angle between the upper sliding slot and the down sliding slot is greater than or equal to 90 degrees.

5. The drive-wheel suspension mechanism according to claim 4, wherein the down sliding slot is not parallel to the horizontal plane, and the angle between the down sliding slot and the upper sliding slot is greater than or equal to 90 degrees.

6. The drive-wheel suspension mechanism according to claim 4, wherein the down sliding slot extends rearwards and the angle between the down sliding slot and the horizontal plane is greater than 0 degree, and the upper sliding slot extends forwards and an included angle between the down sliding slot and a vertical plane is greater than 0 degree.

7. The drive-wheel suspension mechanism according to claim 1, wherein the down sliding slot of the second sliding slot assembly is arranged angularly and downwardly with respect to the front end of the upper sliding slot of the second sliding slot assembly, wherein an angle between the upper sliding slot and the down sliding slot is greater than or equal to 90 degrees.

8. A smart movable device, comprising a main frame and a drive-wheel suspension mechanism connected to the main frame, the drive-wheel suspension system comprising a drive wheel, a drive wheel bracket, a gearbox and a resilient reset member, wherein the drive wheel is arranged partially within the drive wheel bracket;

the drive wheel bracket is provided with a first sliding slot assembly arranged at a lower end of the gear box and a second sliding slot assembly arranged at an upper end of the gear box, wherein the first sliding slot assembly comprises a first down sliding slot and a first upper sliding slot, and the second sliding slot assembly comprises a second down sliding slot and a second upper sliding slot, wherein the drive wheel is mounted to an axle disposed at the lower end of the gear box, and the axle is configured to slide in the first sliding slot assembly;

the gearbox is located in the drive wheel bracket, and is provided with at least one sliding shaft configured to slide within the second sliding slot assembly; and the resilient reset member has a first end fixed to the gearbox and a second end fixed to the drive wheel bracket; and, wherein when the drive wheel is rotating on a flat surface, the axle is located at a juncture of the down and upper sliding slots of the first sliding slot assembly, the shaft is located at a juncture of the down and upper sliding slots of the second sliding slot assembly, and the resilient reset member is in a non-elastic position; and when the drive wheel encounters an obstacle, the axle slides across the upper sliding slot of the first sliding slot assembly, the shaft slides across the upper sliding slot of the second sliding slot assembly, and the resilient reset member stretches into an elastic position.

9. The smart movable device according to claim 8, further comprising a front wheel disposed to the main frame.

10. The smart movable device according to claim 9, wherein the smart movable device is a robot vacuum cleaner.

11. The smart movable device according to claim 8, wherein the gearbox is further provided with a drive motor configured to control a movement of the axle, the gearbox is arranged obliquely upwards and rearwards, the axle is disposed at a lower end of the gearbox, and the drive motor is disposed at an upper end of the gearbox.

12. The smart movable device according to claim 11, wherein the drive wheel bracket comprises a side plate disposed at a front end of the drive wheel bracket, the second end of the resilient reset member is fixed to the side plate, and the resilient reset member is a tension spring.

13. The smart movable device according to claim 8, wherein the down sliding slot of the first sliding slot assembly is arranged angularly and downwardly with respect to the front end of the upper sliding slot of the first sliding slot assembly, wherein an angle between the upper sliding slot and the down sliding slot is greater than or equal to 90 degrees.

14. The smart movable device according to claim 13, wherein the down sliding slot is not parallel to the horizontal plane, and the angle between the down sliding slot and the upper sliding slot is greater than or equal to 90 degrees.

15. The smart movable device according to claim 14, wherein the down sliding slot extends rearwards and the angle between the down sliding slot and the horizontal plane is greater than 0 degree, and the upper sliding slot extends forwards and an included angle between the down sliding slot and a vertical plane is greater than 0 degree.

16. The smart movable device according to claim 8, wherein the down sliding slot of the second sliding slot assembly is arranged angularly and downwardly with respect to the front end of the upper sliding slot of the second sliding slot assembly, wherein an angle between the upper sliding slot and the down sliding slot is greater than or equal to 90 degrees.

17. A smart movable device, comprising a main frame and a drive-wheel suspension mechanism connected to the main frame, the drive-wheel suspension mechanism comprising a drive wheel, a drive wheel bracket, a gearbox and a resilient reset member, wherein the drive wheel is arranged partially within the drive wheel bracket;

the drive wheel bracket is provided with a first sliding slot assembly arranged at a lower end of the gear box and a second sliding slot assembly arranged at an upper end of the gear box wherein the first sliding slot assembly comprises a first down sliding slot and a first upper sliding slot, and the second sliding slot assembly comprises a second down sliding slot and a second upper sliding slot, the first down sliding slot communicating with the first upper sliding slot, the second down sliding slot communicating with the second upper sliding slot;

the gearbox is located in the drive wheel bracket, and is provided with at least one sliding shaft configured to slide within the second sliding slot assembly; and the resilient reset member has a first end fixed to the gearbox and a second end fixed to the drive wheel bracket.

\* \* \* \* \*